United States Patent [19]
Yoshida et al.

[11] Patent Number: 5,519,301
[45] Date of Patent: May 21, 1996

[54] CONTROLLING/DRIVING APPARATUS FOR AN ELECTRICALLY-DRIVEN COMPRESSOR IN A CAR

[75] Inventors: Makoto Yoshida; Masafumi Nishimiya, both of Kusatsu, Japan

[73] Assignee: Matsushita Electric Industrial Co., Ltd., Osaka, Japan

[21] Appl. No.: 291,599

[22] Filed: Aug. 16, 1994

Related U.S. Application Data

[63] Continuation-in-part of Ser. No. 19,562, Feb. 18, 1993, abandoned.

[30] Foreign Application Priority Data

Feb. 26, 1992 [JP] Japan .................................. 4-039116

[51] Int. Cl.⁶ .............................. B60H 1/32; H02P 5/41
[52] U.S. Cl. .............................. 318/811; 323/299; 363/41
[58] Field of Search .............................. 318/807, 808, 318/810, 811; 323/299, 300; 363/40, 41, 74, 131, 132, 133, 135, 136, 137, 141

[56] References Cited

U.S. PATENT DOCUMENTS

| | | |
|---|---|---|
| 4,459,519 | 7/1984 | Erdman . |
| 4,467,258 | 8/1984 | Leuthen .................................. 318/800 |
| 4,468,569 | 8/1984 | Norris . |
| 4,480,299 | 10/1984 | Muto et al. .................................. 363/41 |
| 4,567,391 | 1/1986 | Tucker et al. . |
| 4,580,090 | 4/1986 | Bailey et al. . |
| 4,620,140 | 10/1986 | Chonan . |
| 4,649,334 | 3/1987 | Nakajima . |
| 4,656,571 | 4/1987 | Umezu . |
| 5,075,608 | 12/1991 | Erdman et al. . |
| 5,121,043 | 6/1992 | Kerkman et al. .................................. 318/805 |
| 5,126,642 | 6/1992 | Shahrodi .................................. 318/433 |
| 5,256,949 | 10/1993 | Reichard et al. .................................. 318/254 |
| 5,299,432 | 4/1994 | Nakae et al. .................................. 62/298 |
| 5,329,217 | 7/1994 | Kerkman et al. .................................. 318/811 |
| 5,376,866 | 12/1994 | Erdman .................................. 318/254 |
| 5,404,089 | 4/1995 | Flanagan et al. .................................. 318/811 |

*Primary Examiner*—Bentsu Ro
*Attorney, Agent, or Firm*—Watson Cole Stevens Davis

[57] ABSTRACT

A controlling/driving apparatus for an electrically-driven compressor of an air conditioner mounted in an automobile. The apparatus comprises a DC-AC converting invertor 4 for converting a DC voltage into a pseudo AC voltage (e.g. a pulse train of positive and negative pulses), a DC voltage detector 7, and a pulse width changing unit 8 for changing the width of each pulse of the pulse train in accordance with the DC voltage detected by the DC voltage detector. Thus, the apparatus enables safe and efficient operation of the compressor with improved electric insulation and durability when large fluctuations in the power source voltage of the compressor occur.

52 Claims, 8 Drawing Sheets

FIG. 6

| | | RANGE OF REVOLUTIONS | |
| --- | --- | --- | --- |
| | | 0~3600 (rpm) | 3600~7200 (rpm) |
| REVOLUTION-NUMER DECREASING SPEED | LOW | ○ | ○ |
| | HIGH | × | ○ |
| REVOLUTION-NUMER INCREASING SPEED | LOW | ○ | ○ |
| | HIGH | ○ | × |

IN DECREASE OF REVOLUTION-NUMBER:

○ INDICATES GOOD RECOLLECTION OF DISCHARGED LUBRICANT.
× INDICATES BAD RECOLLECTION OF DISCHARGED LUBRICANT.

IN INCREASE OF REVOLUTION-NUMBER:

○ INDICATES SMALL QUANTITY OF DISCHARGED LUBRICANT.
× INDICATES LARGE QUANTITY OF DISCHARGED LUBRICANT.

FIG. 7(a)  VDC = 200V
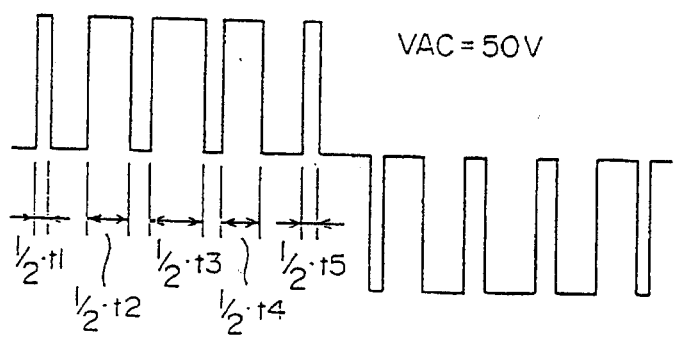
FIG. 7(b)  VDC = 400V
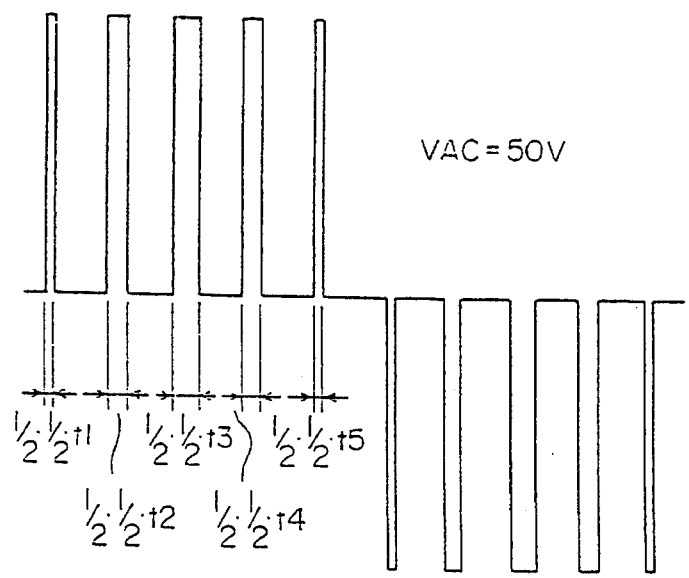
FIG. 7(C)  VDC = 160V
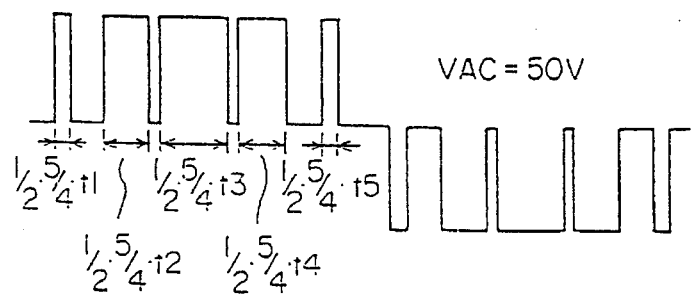

CONTROLLING/DRIVING APPARATUS FOR AN ELECTRICALLY-DRIVEN COMPRESSOR IN A CAR

CROSS REFERENCE TO RELATED APPLICATION

This is a continuation-in-part of U.S. application Ser. No. 08/019,562, filed Feb. 18, 1993, (abandoned), the entire disclosure of which is hereby expressly incorporated by reference.

BACKGROUND OF THE INVENTION

The present invention relates to a controlling/driving apparatus for an electrically-driven compressor in a car.

Techniques for controlling/driving an electrically-driven compressor have been used mainly for domestic room air conditioners. In this case, the commercial power source which powers a room air conditioner has fluctuations in voltage of about ±5% of a nominal voltage and therefore the power source is quite stable. Accordingly, it has not been so necessary to take into consideration such fluctuations in power source voltage. However, in the case where an electrically-driven compressor is to be mounted in a car, no consideration has been taken on this matter either.

In a car air conditioner, however, if it is intended to drive a compressor by the power of a battery without relying on a conventional method in which the rotation of an engine is directly transmitted to the compressor, problems may occur as follows.

That is, the fluctuations in power source voltage in a car are very large in comparison with those of the domestic electric vehicle, the power source voltage falls when the car is accelerated because a large load current flows in the drive motor, while the power source voltage rises, due to a regenerative current supplied from the drive motor, when the car is decelerated. The range of such voltage fluctuations or variations can be larger than ±30%, which is very large in comparison to that of voltage variations in commercial power sources. Such a large range of voltage variations may be generated suddenly and frequently. FIG. 4 shows examples of such voltage variations in various running modes of an electric car. Accordingly, also the application voltage to an electrically-driven compressor fluctuates greatly in accordance with the running condition of the car.

In the case of an induction motor, therefore, the motor becomes overloaded (resulting in torque shortage) when the power source voltage falls, while it becomes overexcited (resulting in saturation of magnetic flux) when the power source voltage rises. Thus, the defects of increase of the motor current and lowering of the motor efficiency occur.

Particularly in the case of a high-pressure-hermetically-sealed-type electrically-driven compressor, which has an electrical motor portion installed in a high-temperature and high-pressure gas atmosphere, the temperature of the motor windings may easily exceed a tolerable temperature limit, which easily gives rise to a problem of deterioration of the electric insulation of the motor windings. A further problem is also involved such that once compressor operation is stopped because of overheating of the motor winding it can not be restarted until a pressure difference becomes lower than a given small pressure difference between the exhaust air pressure and the intake air pressure of the compressor. In certain examples it takes about two to three minutes from the stop to the restart of the compressor operation, and this gives rise to a further problem of temperature variations in the car compartment. In the case where a DC brushless motor is employed as the motor of an electrically-driven compressor, the speed of rotation becomes low when the power source voltage falls, and it becomes high when the power source voltage rises, so that there has been a problem that the speed of rotation of the compressor fluctuates greatly. As a consequence, the car air conditioner produces temperature variations at its exhaust port; or, referring to FIG. 5, compressing portion 11 of the air conditioner is subject to increased wear of portions on slide surfaces of the shaft 12 and bearing 13 due to such sudden variations in revolutions of the compressing portion, and such worn portions give rise to a problem of reducing the compressor durability.

The sudden variations in the revolutions in the compressor may result in discharging internal lubricant (oil) from the compressor, and in difficulty in recollecting such discharged lubricant resulting in shortening of the compressor's service life.

FIG. 6 shows a table indicating qualitative characteristics between revolution speeds, quantities of discharged lubricant and quantities of recollected lubricant with respect to a compressor. Significant problems may arise particularly in the case of sudden speed decrease to a low revolutional speed or in the case of a sudden speed increase in a high revolutional speed range. For the sake of comparison, it may be noted that the range of rotational speed variations in conventional electric compressors for home-room air-conditioners is on the order of about 5 revolutions/$S^2$, and thus they have been free from the above-mentioned problems.

Car compressors of the above-mentioned type have another problem of possible increases in leakage currents flowing from the motor stator winding, through coolant, to the surface of the compressor with increases in the power source voltage, such increased leakage current is liable to lead to electric shocks being given to operators or users.

SUMMARY OF THE INVENTION

In order to solve the above problems, it is an object of the present invention to prevent a motor of an electrically-driven compressor from being overloaded or overexcited or from large fluctuations in rotation speeds even if a power source voltage largely fluctuates in accordance with the running condition of a car.

Another object of the present invention is to provide a compressor drive control apparatus for enabling safe and efficient operation of an electrically-driven compressor without deteriorating operation stability at room temperatures and with improved electric insulation and durability of the compressor.

In order to solve the above-mentioned problems and achieve the objects, according to one aspect of the present invention, a car compressor drive control apparatus for an electrically-driven compressor for a car is provided, the apparatus comprising:

means for generating a DC voltage;

an electrically-driven compressor including an internal electric motor;

DC-AC conversion means including a group of switching elements and adapted to receive and convert the generated DC voltage to a pseudo AC voltage formed of a train of positive and negative pulses for driving the motor;

DC voltage detection means for detecting the DC voltage; and control means for generating and applying pulse-width modulation signals to the switching elements in order for generation of the converted train of the pulse voltages, the control means including memory means for storing fundamental pulse width data, and pulse-width changing means storing programmed data and adapted to read from the memory a pulse-width data to change the data in response to the DC voltage detected by the detection means in order for the generation of the pulse-width modulation signals.

In the above configuration according to the present invention, when a DC voltage is converted into a pseudo AC voltage, like a pulse train of positive and negative pulses, by the DC-AC conversion means, the width of pulses of the pulse train is changed by the pulse width changing means relying upon software, for example, in accordance with the DC voltage detected by the DC voltage detection means to thereby make the effective value of the pseudo AC voltage constant, so that it is possible to operate the compressor safely and efficiently without degrading its operational stability at room temperatures, and yet it is possible to improve the service life as well as the electric-insulation strength of the compressor even if the power source voltage greatly fluctuates and varies in accordance with the running condition of a car.

BRIEF DESCRIPTION OF THE DRAWINGS

FIG. 6 shows a qualitative table illustrating a relation of lubricant discharged amounts, recollected amounts and rotation speed variations of the compressor;

FIGS. 7A–C show line voltage diagrams in one embodiment of the present invention.

DESCRIPTION OF THE PREFERRED EMBODIMENT

Figure 1:
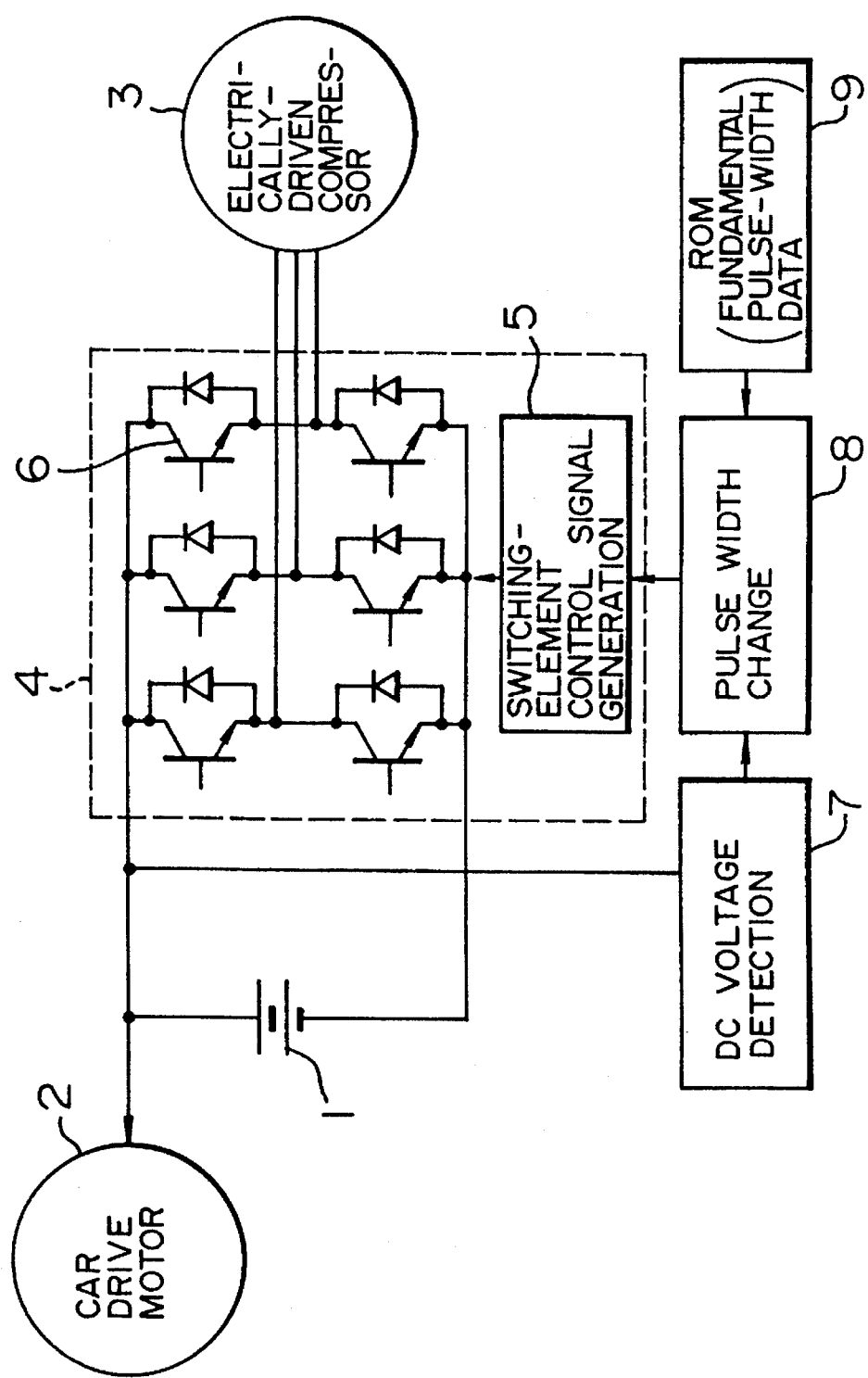
FIG. 1 is a block diagram showing an embodiment of the present invention.

Referring to the drawings, description will be made of an embodiment of the controlling/driving apparatus for an electrically-driven compressor in an automobile, according to the present invention.

FIG. 1 is a constituent block diagram showing the embodiment of the present invention. In FIG. 1, a battery 1 acts as a power source for a drive motor 2 as well as a power source for an electrically-driven compressor 3 for air conditioning. A DC-AC conversion means 4 turns a switching element 6 on/off in accordance with a signal from a switching-element control signal generation portion 5 incorporated in the DC-AC conversion means 4 to thereby convert a DC voltage from the battery 1 into a three-phase pseudo AC voltage e.g. a rectangular pulse train. The three-phase pseudo AC voltage is variable in voltage and in frequency, and is supplied to the electrically-driven compressor 3 to drive the latter. The drive frequency at which the compressor is operated is selectably set by an external setting means, such as a select switch, in dependence upon environmental conditions such as temperature or humidity inside and outside of the automobile or car interior. A DC voltage detection means 7 detects the DC voltage at the input side of the DC-AC conversion means 4. A pulse width changing means 8 includes a computing device, for example, a microcomputer and reads out fundamental pulse width data from a ROM 9 and changes the fundamental pulse width data in accordance with the DC voltage detected by the detection means 7. The pulse width changing means 8 supplies the changed fundamental pulse width data to the switching-element control signal generation portion 5. The ROM 9 stores, e.g., the fundamental pulse-width data representative of pulse widths $t_1$ to $t_5$ shown in FIG. 2A. Alternatively it may store data in terms of control signal levels for controlling each switching element.

Figure 2A:
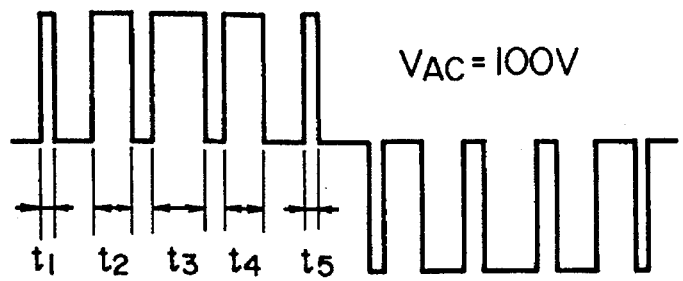
FIGS. 2A to 2C are diagrams showing line voltages according to the embodiment of the present invention.
Figure 2B:
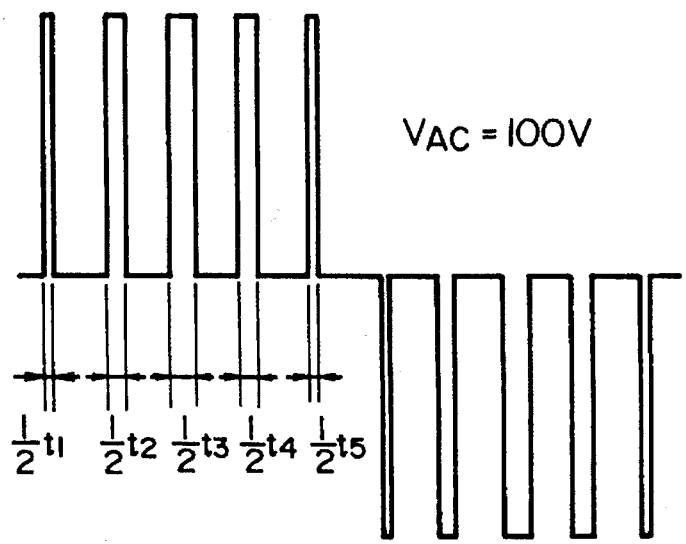
Figure 2C:
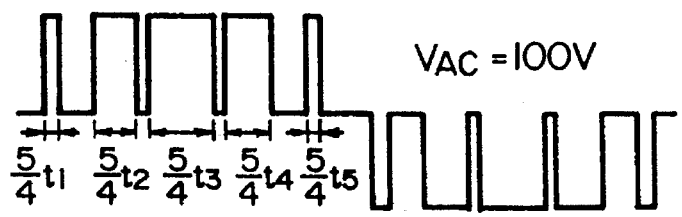

FIGS. 2A to 2C are line-voltage diagrams showing the manner in which the line voltage of the three-phase pseudo AC voltage supplied to the electrically-driven compressor 3 varies at the same output frequency when the DC voltage fluctuates. In these Figures, the output frequency of the pseudo AC voltage, i.e., the compressor operating frequency is selected at 120 Hz. Desired output voltages $V_{AC}$ are taken to be equal to the data of pseudo AC voltages held in the ROM. The operation of the controlling/driving apparatus for an electrically-driven compressor in an automobile according to the embodiment of the present invention will be described with respect to the case where the nominal voltage is DC 200 V. The diagram of FIG. 2A shows the line voltage when the actual DC voltage $V_{DC}$ is DC 200 V which is equal to the nominal voltage. In this case the respective output pulse widths $t_1$, $t_2$, $t_3$, $t_4$ and $t_5$ are equal to those of the fundamental pulse width data in the ROM 9 and the effective value $V_{AC}$ of the line voltage supplied to the electrically-driven compressor 3 is 100 V. The diagram of FIG. 2B shows the line voltage when the DC voltage $V_{DC}$ actually detected by the DC voltage detection means 7 is 400 V. In this case, if the respective output pulse widths $t_1$, $t_2$, $t_3$, $t_4$ and $t_5$ are equal to those of the fundamental pulse width data in the ROM 9, the effective value $V_{AC}$ of the line voltage is 200 V. But each of the respective output pulse widths $t_1$, $t_2$, $t_3$, $t_4$ and $t_5$ is multiplied by ½ so as to make the respective output pulse widths be (½)$t_1$, (½)$t_2$, (½)$t_3$, (½)$t_4$ and ()$t_5$ so that the effective value $V_{AC}$ of the line voltage supplied to the electrically-driven compressor 3 is again 100 V unchanged. The diagram of FIG. 2C shows the line voltage when the DC voltage $V_{DC}$ actually detected by the DC voltage detection means 7 is 160 V. In this case, each of the respective output pulse widths $t_1$, $t_2$, $t_3$, $t_4$ and $t_5$ is multiplied by 5/4 so as to make the respective output pulse widths be (5/4)$t_1$, (5/4)$t_2$, (5/4)$t_3$, (5/4)$t_4$ and (5/4)$t_5$ so that the effective value $V_{AC}$ of the line voltage supplied to the electrically-driven compressor 3 is again 100 V unchanged.

Figure 3:
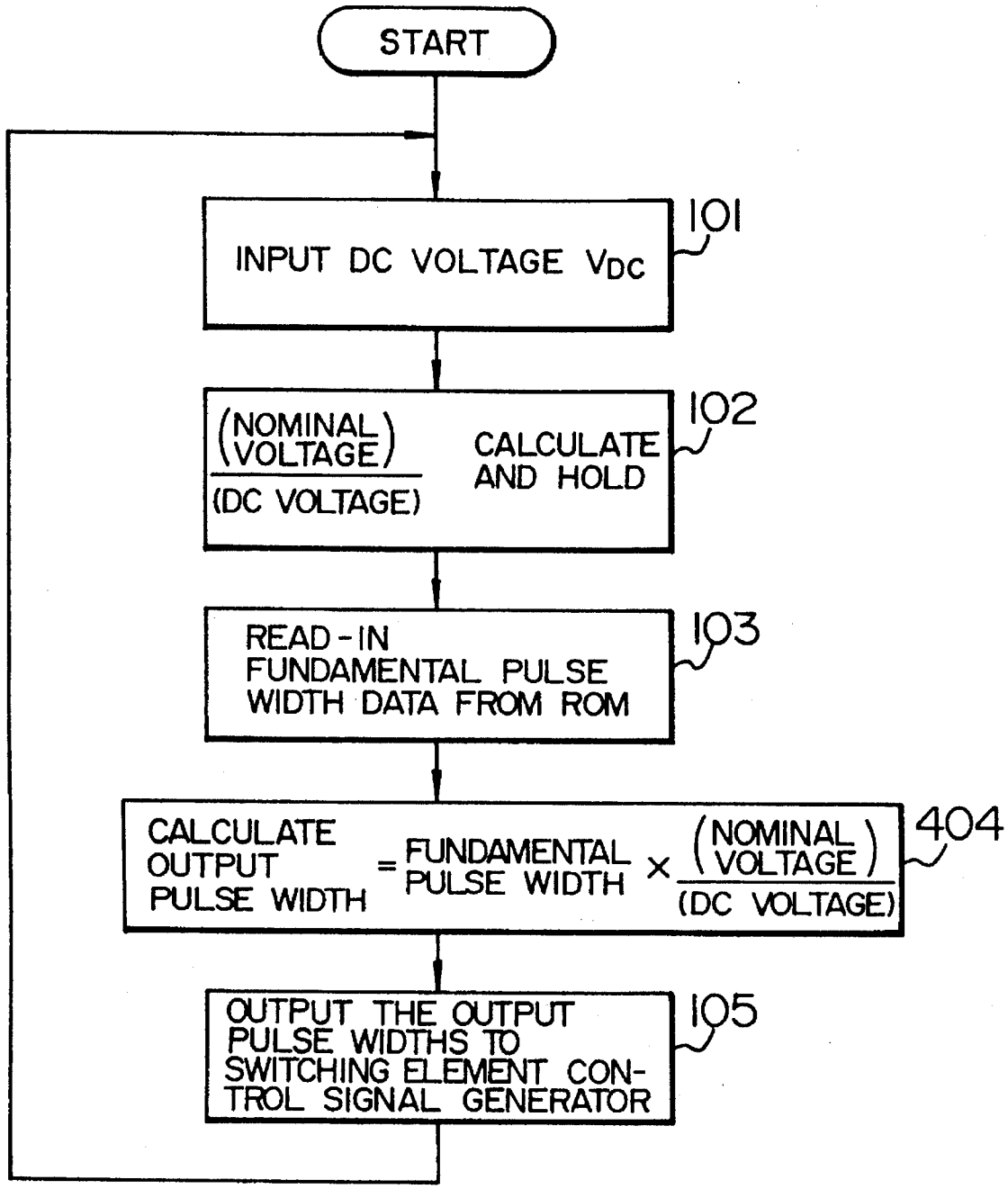
FIG. 3 is a control flowchart showing an embodiment of the present invention.
Figure 4:
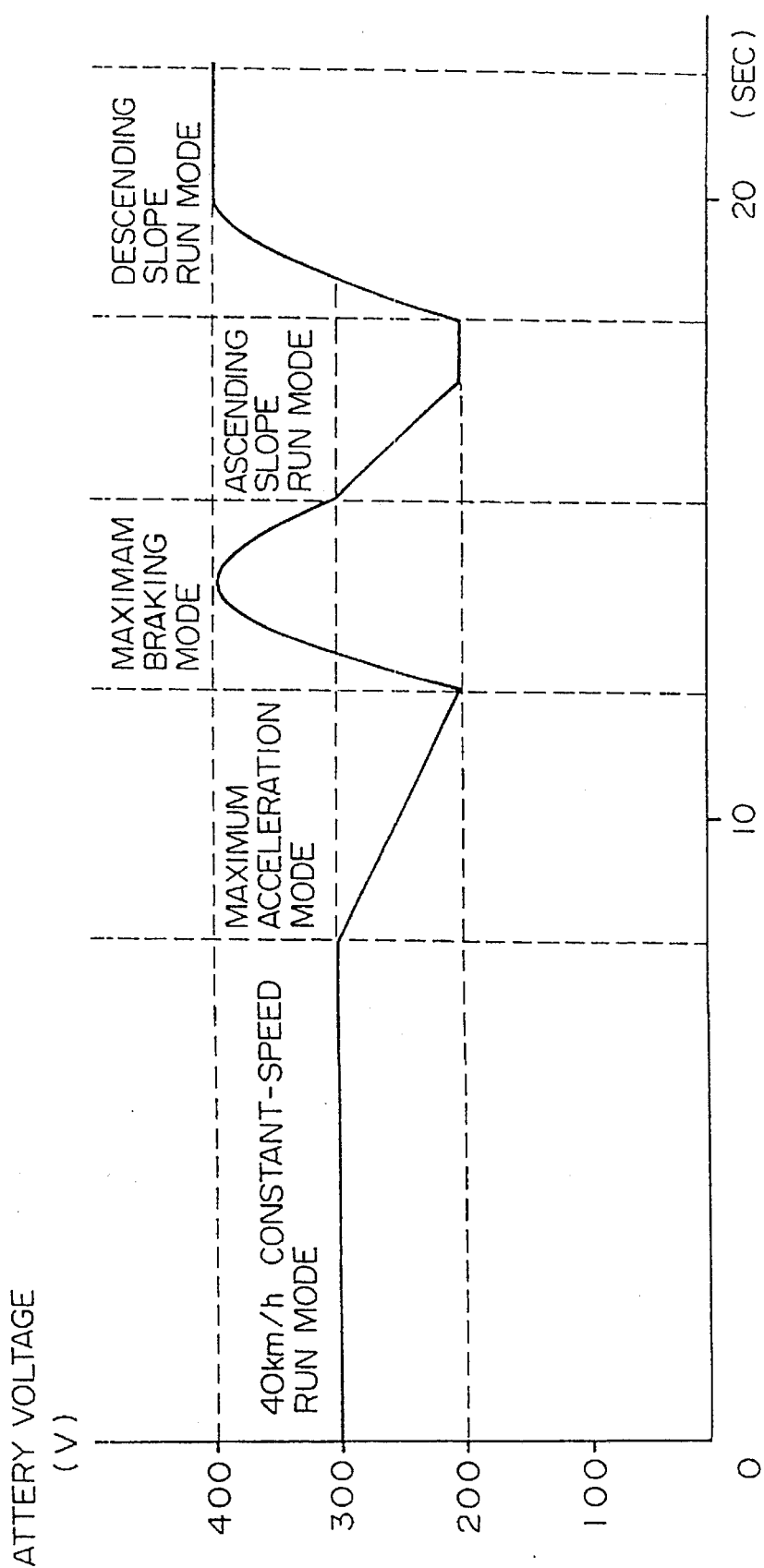
FIG. 4 shows an example of voltage variation modes in the case of an electric car.
Figure 5:
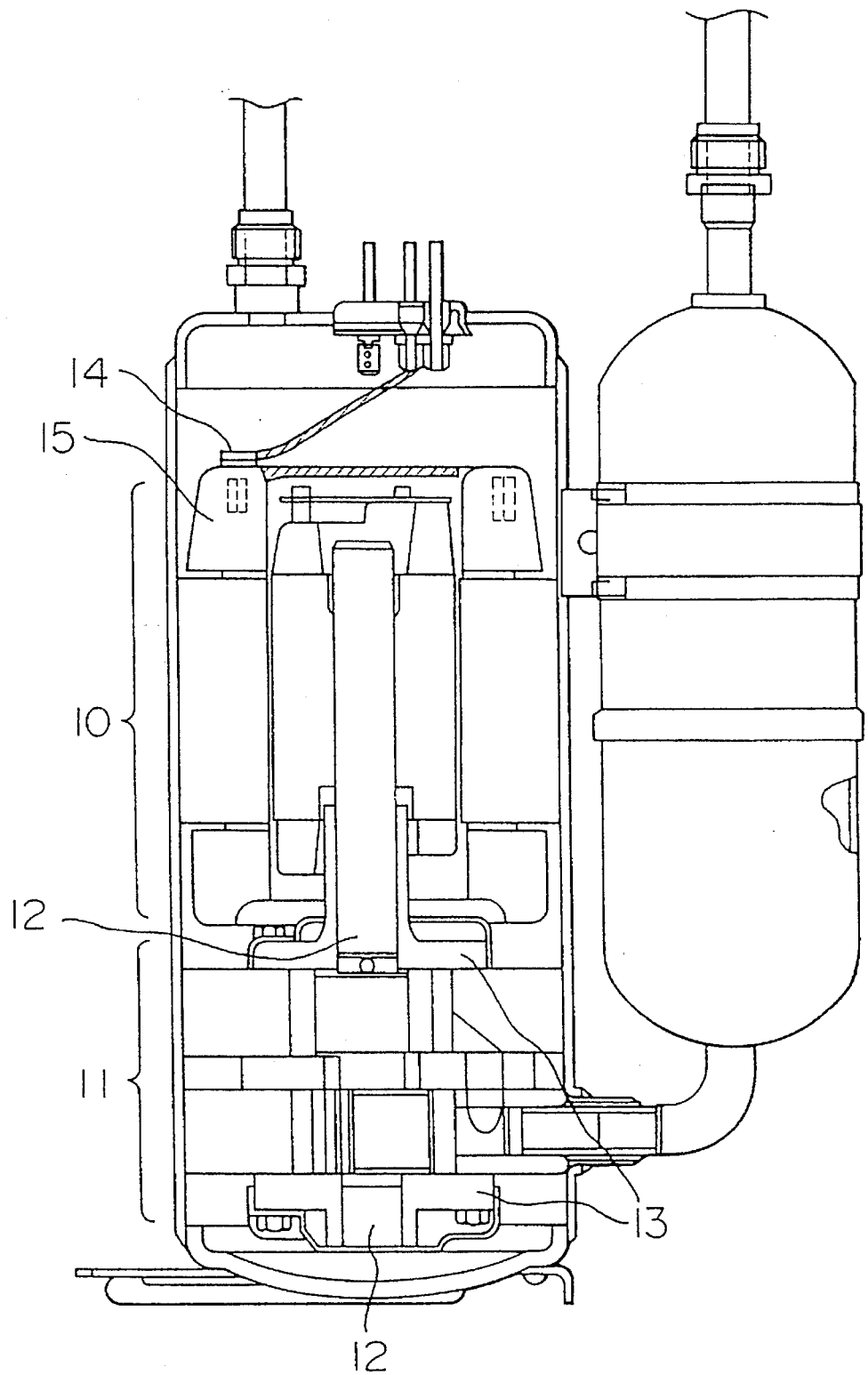
FIG. 5 shows a longitudinal sectional view of a hermetically-sealed type electrically-driven compressor.

FIG. 3 shows a control flowchart of the control data stored in and executed by the pulse width changing means 8, which includes the microcomputer. According to this flowchart, the DC voltage $V_{DC}$ is inputted (a step 101), and then a value of (nominal-voltage/DC-voltage)

is calculated and held (a step 102). Next, the fundamental pulse width data corresponding to the frequency at that time are read from the ROM 9 (a step 103), and the values of (fundamental pulse widths)×(nominal-voltage/DC-voltage)

are calculated as output pulse widths (a step 104) and supplied to the switching-element control signal generation portion 5 (a step 105). Thus, the values obtained by multiplying the fundamental pulse width data by the value of (nominal-voltage/actual-DC-voltage)

are made to be the output pulse widths to thereby make it possible to control the effective value of the line voltage to be constant.

FIGS. 7A–C show line voltage diagrams in the case of desired output voltages which were changed from those shown in FIG. 2 with a frequency change of the pseudo AC voltage. As illustrated in FIGS. 7A–C, in which the compressor operating frequency is selected at 60 Hz, each pulse width is given by multiplying a corresponding pulse width shown in FIGS. 2A–C by a proportion "½" determined in dependence upon the AC voltage frequency and by the suitable factor based on the DC voltage.

Figure 8:
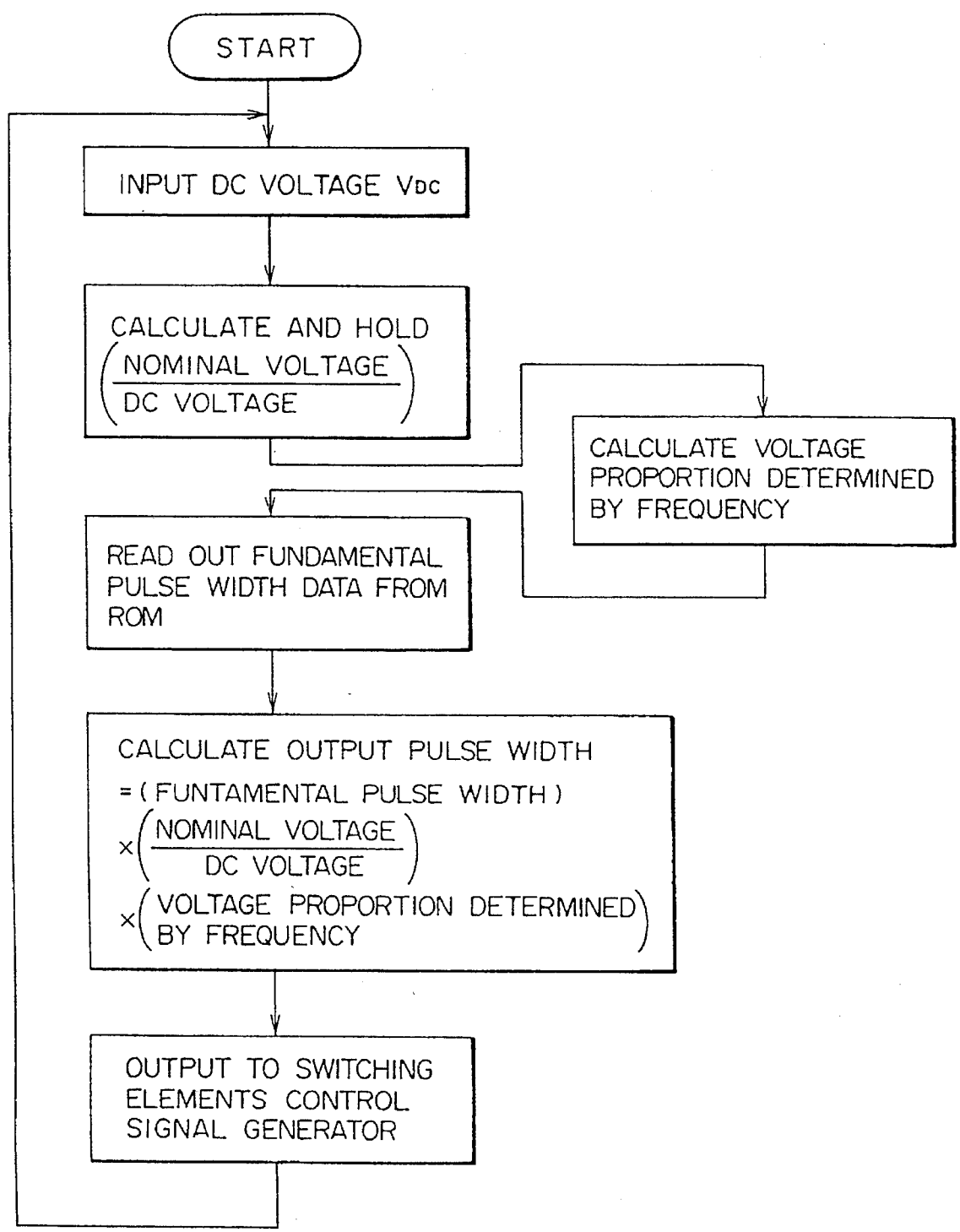
FIG. 8 shows a control flow chart for the embodiment.

FIG. 8 shows a control flowchart for pulse-width modulation to generate the pseudo AC voltage. The control data of the flowchart is stored in and executed by the pulse width changing means 8. Alternatively, the pulse width changing means may include means for determining a first proportion of the DC voltage detected by the detection means 7 to a preset DC voltage, a second proportion of a value of the pseudo AC voltage determined based upon the compressor revolutions number or operation frequency with respect to a preset value of the pseudo AC voltage, and a third proportion equal to a product of the first and second proportions; and include means for changing the pulse width of the pseudo AC voltage through the control of the multiplication of the fundamental pulse-width data by any one of the first to third proportions. Thus, it is likely that the duty ratios of the resulting AC voltage pulses are substantially or approximately equal to those of the fundamental width multiplied by any one of the first to third proportions.

As described above, according to one aspect of the present invention, there is provided a car compressor drive control apparatus for an electrically-driven compressor for a car, comprising:

means for generating a DC voltage;

a hermetically-sealed type electrically-driven compressor including an internal electric motor and adapted to compress air conditioning coolant;

DC-AC conversion means including a group of switching elements and adapted to receive and convert the generated DC voltage to a pseudo AC voltage formed of a train of positive and negative pulses for driving motor;

DC voltage detection means for detecting the DC voltage; and control means for applying pulse-width modulation signals to the switching elements in order for generation of the converted train of the pulse voltages, the control means including pulse-width changing means including a microcomputer storing programmed data for changing pulse width of the pulse train, via software, in response to the detected DC voltage.

Accordingly, even if the power source voltage fluctuates greatly in accordance with the running condition of a car it makes it possible to operate the compressor safely and efficiently without degrading its operational stability at room temperatures, and yet it improves endurance properties as well as electric insulation property of the compressor. By virtue of using data computing operations of the microcomputer for all of the necessary pulse-width modulating operations, the present invention makes it possible to improve the environment-withstanding property as well as the noise-resistance property against external noise of the compressor in comparison with those obtainable with the pulse-width modulation effected in hardware. The apparatus or compressor can be installed in various types of electric cars with different magnitudes of power voltages by modifying the ROM or control manner of software, thus a simplified installation can be expected.

What is claimed is:

1. A compressor drive control apparatus for an electrically-driven compressor for a car, said apparatus comprising:

an electrically-driven compressor including an electric motor;

DC-AC conversion means including a group of switching elements which receive and convert a DC voltage to a pseudo AC voltage which is formed of a train of positive and negative voltage pulses, said pseudo AC voltage for driving said motor;

DC voltage detection means for detecting said DC voltage; and control means for generating and applying pulse-width modulation signals to said switching elements to generate said train of voltage pulses, said control means including (i) a memory for storing fundamental pulse width data, and (ii) pulse-width changing means for (1) storing programmed data, (2) reading at least a portion of said fundamental pulse-width data from said memory, and (3) changing the read-out fundamental pulse-width data in response to the DC voltage detected by said detection means so as to generate said pulse-width modulation signals.

2. An apparatus according to claim 1, wherein said control means includes a microcomputer.

3. An apparatus according to claim 2, wherein said electric motor is disposed within a cavity of said compressor.

4. An apparatus according to claim 1, wherein said electric motor is disposed within a cavity of said compressor.

5. An apparatus according to claim 1, wherein said pulse-width changing means includes means for (i) determining a first proportion of the DC voltage detected by said detection means to a preset DC voltage, and (ii) changing the pulse width of said pseudo AC voltage in response to said first proportion.

6. An apparatus according to claim 5, wherein said electric motor is disposed within a cavity of said compressor.

7. An apparatus according to claim 1, wherein said pulse-width changing means includes means for (i) determining a second proportion of a value of the pseudo AC voltage determined based upon a number or frequency of compressor revolutions with respect to a preset value of the pseudo AC voltage, and (ii) changing the pulse width of the pseudo AC voltage in response to said second proportion.

8. An apparatus according to claim 7, wherein said electric motor is disposed within a cavity of said compressor.

9. An apparatus according to claim 1, wherein said pulse-width changing means includes means for (i) determining a first proportion of the DC voltage detected by said detection means to a preset DC voltage, a second proportion of a value of the pseudo AC voltage determined based upon a number or frequency of compressor revolutions with respect to a preset value of the pseudo AC voltage, and a third proportion equal to a product of said first and second proportions, and (ii) changing the pulse width of said pseudo AC voltage in response to any one of said first to third proportions.

10. An apparatus according to claim 9, wherein said electric motor is disposed within a cavity of said compressor.

11. An apparatus according to claim 1, wherein said memory for storing data of fundamental pulse widths operates to generate predetermined fundamental pseudo AC voltage pulses.

12. An apparatus according to claim 11, wherein said electric motor is disposed within a cavity of said compressor.

13. An apparatus according to claim 1, wherein said memory is a read-only memory.

14. An apparatus according to claim 13, wherein said electric motor is disposed within a cavity of said compressor.

15. An apparatus according to claim 1, wherein said pulse-width changing means changes the data or pulse width to keep constant an effective value of the pseudo AC voltage so as to avoid possible significant variations due to running speed variations of said car.

16. An apparatus according to claim 15, wherein said electric motor is disposed within a cavity of said compressor.

17. A compressor drive control apparatus for an electrically-driven compressor for an electric car, said apparatus comprising:

an electrically-driven compressor including an electric motor;

DC-AC conversion means including a group of switching elements which receive and convert a DC voltage, which is generated by a car battery which is mounted in said car and which provides power for driving the car, to a pseudo AC voltage which is formed of a train of positive and negative voltage pulses, said pseudo AC voltage for driving said motor;

DC voltage detection means for detecting said DC voltage; and control means for generating and applying pulse-width modulation signals to said switching elements to generate said train of voltage pulses, said control means including (i) a memory for storing fundamental pulse width data, and (ii) pulse-width changing means for (1) storing programmed data, (2) reading at least a portion of said fundamental pulse-width data from said memory, and (3) changing the read-out fundamental pulse-width data in response to the DC voltage detected by said detection means so as to generate said pulse-width modulation signals.

18. An apparatus according to claim 17, wherein said pulse-width changing means is adapted to change the data or pulse width to keep constant an effective value of the converted pseudo AC voltage without possible significant variations due to running speed variations of said electric car.

19. An apparatus according to claim 18, wherein said electric motor is disposed within a cavity of said compressor.

20. An apparatus according to claim 17, wherein said electric motor is disposed within a cavity of said compressor.

21. An apparatus according to claim 17, wherein said pulse-width changing means includes means for (i) determining a first proportion of the DC voltage detected by said detection means to a preset DC voltage, and (ii) changing the pulse width of said pseudo AC voltage in response to said first proportion.

22. An apparatus according to claim 21, wherein said electric motor is disposed within a cavity of said compressor.

23. An apparatus according to claim 17, wherein said pulse-width changing means includes means for (i) determining a second proportion of a value of the pseudo AC voltage determined based upon a number or frequency of compressor revolutions with respect to a preset value of the pseudo AC voltage, and (ii) changing the pulse width of the pseudo AC voltage in response to said second proportion.

24. An apparatus according to claim 23, wherein said memory is a read-only memory.

25. An apparatus according to claim 24, wherein said electric motor is disposed within a cavity of said compressor.

26. An apparatus according to claim 23, wherein said electric motor is disposed within a cavity of said compressor.

27. An apparatus according to claim 17, wherein said pulse-width changing means includes means for (i) determining a first proportion of the DC voltage detected by said detection means to a preset DC voltage, a second proportion of a value of the pseudo AC voltage determined based upon a number or frequency of compressor revolutions with respect to a preset value of the pseudo AC voltage, and a third proportion equal to a product of said first and second proportions, and (ii) changing the pulse width of said pseudo AC voltage in response to any one of said first to third proportions.

28. An apparatus according to claim 27, wherein said electric motor is disposed within a cavity of said compressor.

29. An apparatus according to claim 17, wherein said memory for storing data of fundamental pulse widths operates to generate predetermined fundamental pseudo AC voltage pulses.

30. An apparatus according to claim 29, wherein said electric motor is disposed within a cavity of said compressor.

31. An apparatus according to claim 17, wherein said control means includes a microcomputer.

32. An apparatus according to claim 31, wherein said electric motor is disposed within a cavity of said compressor.

33. A compressor drive control apparatus for an electrically-driven compressor for a car, comprising:

means for generating a DC voltage;

a hermetically-sealed type electrically-driven compressor including an electric motor and adapted to compress air conditioning coolant;

DC-AC conversion means including a group of switching elements and adapted to receive and convert the generated DC voltage to a pseudo AC voltage, formed of a train of positive and negative pulses, for driving said motor;

DC voltage detection means for detecting the DC voltage; and control means for a generating and applying pulse-width modulation signals to said switching elements to generate the converted train of the pulse voltages, said control means including (i) a memory for storing fundamental pulse width data, and (ii) pulse-width changing means for storing programmed data for changing a pulse width of said pulse train in response to the DC voltage detected by said detection means.

34. An apparatus according to claim 33, wherein said pulse-width changing means is adapted to read a fundamental pulse width data from said memory and to change the read fundamental pulse width data in response to the DC voltage detected by said detection means.

35. An apparatus according to claim 34, wherein said electric motor is disposed within a cavity of said compressor.

36. An apparatus according to claim 33, wherein said pulse-width changing means includes means for (i) determining a first proportion of the DC voltage detected by said detection means to a preset DC voltage, and (ii) changing the pulse width of said pseudo AC voltage in response to said first proportion.

37. An apparatus according to claim 36, wherein said electric motor is disposed within a cavity of said compressor.

38. An apparatus according to claim 33, wherein said control means includes a microcomputer.

39. An apparatus according to claim 38, wherein said electric motor is disposed within a cavity of said compressor.

40. An apparatus according to claim 33, wherein said electric motor is disposed within a cavity of said compressor.

41. A compressor drive control apparatus for an electrically-driven compressor for an electric car, said apparatus comprising:

a car battery mounted in said car as a power source for driving said car and generating a DC voltage;

a hermetically-sealed type electrically-driven compressor including an electric motor and adapted to compress air conditioning coolant;

DC-AC conversion means including a group of switching elements and adapted to receive and convert the generated DC voltage to a pseudo AC voltage, formed of a train of positive and negative pulses, for driving said motor;

DC voltage detection means for detecting the DC voltage; and control means for a generating and applying pulse-width modulation signals to said switching elements to generate the converted train of the pulse voltages, said control means including (i) a memory for storing fundamental pulse width data, and (ii) pulse-width changing means for (1) storing programmed data, and (2) changing a pulse width of said pulse train in response to the DC voltage detected by said detection means.

42. An apparatus according to claim 41, wherein said pulse-width changing means is adapted to change the data or pulse width to keep constant an effective value of the converted pseudo AC voltage without possible significant variations due to running speed variations of said electric car.

43. An apparatus according to claim 42, wherein said electric motor is disposed within a cavity of said compressor.

44. An apparatus according to claim 41, wherein said electric motor is disposed within a cavity of said compressor.

45. A compressor drive control apparatus for an electrically-driven compressor for a car, comprising:

a hermetically-sealed type electrically-driven compressor including an electric motor, said compressor for compressing air conditioning coolant;

DC-AC conversion means including a group of switching elements which receive and convert a DC voltage to a pseudo AC voltage which is formed of a train of positive and negative voltage pulses, said pseudo AC voltage for driving said motor;

DC voltage detection means for detecting the DC voltage; and control means for generating and applying pulse-width modulation signals to said switching elements to generate said train of voltage pulses, said control means including (i) a memory for storing fundamental pulse width data, and (ii) pulse-width changing means for storing programmed data for changing a pulse width of said train of voltage pulses in response to the DC voltage detected by said detection means;

wherein said pulse-width changing means includes means for (i) determining a first proportion of the DC voltage detected by said detection means to a preset DC voltage, a second proportion of a value of the pseudo AC voltage determined based upon a number or frequency of compressor revolutions with respect to a preset value of the pseudo AC voltage, and a third proportion equal to a product of said first and second proportions, and (ii) changing the pulse width of said pseudo AC voltage in response to any one of said first to third proportions.

46. An apparatus according to claim 45, wherein said memory for storing data of fundamental pulse widths operates to generate predetermined fundamental pseudo AC voltage pulses.

47. An apparatus according to claim 46, wherein said memory is a read-only memory.

48. An apparatus according to claim 47, wherein said electric motor is disposed within a cavity of said compressor.

49. An apparatus according to claim 46, wherein said electric motor is disposed within a cavity of said compressor.

50. An apparatus according to claim 45, wherein said electric motor is disposed within a cavity of said compressor.

51. A compressor drive control apparatus for an electrically-driven compressor for a car, comprising:

a hermetically-sealed type electrically-driven compressor including an electric motor, said compressor for compressing air conditioning coolant;

DC-AC conversion means including a group of switching elements which receive and convert a DC voltage to a pseudo AC voltage which is formed of a train of positive and negative voltage pulses, said pseudo AC voltage for driving said motor;

DC voltage detection means for detecting the DC voltage; and control means for generating and applying pulse-width modulation signals to said switching elements to generate said train of voltage pulses, said control means including (i) a memory for storing fundamental pulse width data, and (ii) pulse-width changing means for storing programmed data for changing a pulse width of said train of voltage pulses in response to the DC voltage detected by said detection means;

wherein said pulse-width changing means includes means for (i) determining a second proportion of a value of the pseudo AC voltage determined based upon a number or frequency of the compressor revolutions with respect to a preset value of the pseudo AC voltage, and (ii) changing the pulse width of the pseudo AC voltage in response to said second proportion.

52. An apparatus according to claim 51, wherein said electric motor is disposed within a cavity of said compressor.

* * * * *